United States Patent [19]

Takigawa et al.

[11] Patent Number: 5,498,475
[45] Date of Patent: Mar. 12, 1996

[54] COATED PLASTIC MOLDED ARTICLES

[75] Inventors: Akio Takigawa, Nishinomiya; Naoto Hirayama, Takarazuka; Masaki Kitaoka, Toyonaka, all of Japan

[73] Assignee: Nippon Sheet Glass Co., Ltd., Osaka, Japan

[21] Appl. No.: 160,327

[22] Filed: Dec. 2, 1993

Related U.S. Application Data

[63] Continuation of Ser. No. 708,739, May 31, 1991, abandoned.

[30] Foreign Application Priority Data

May 31, 1990 [JP] Japan ................................ 2-142661
Mar. 27, 1991 [JP] Japan ................................ 3-087474

[51] Int. Cl.$^6$ .......................... B32B 27/30; B32B 27/36
[52] U.S. Cl. ........................ 428/334; 427/508; 428/215; 428/216; 428/335; 428/336; 428/412; 428/446; 428/447; 428/448; 428/451; 428/483; 428/520; 428/908.8
[58] Field of Search ................... 427/508; 428/215, 216, 334, 335, 336, 446, 447, 448, 451, 412, 480, 483, 520, 908.8

[56] References Cited

U.S. PATENT DOCUMENTS

| | | | |
|---|---|---|---|
| 4,284,685 | 8/1981 | Olson et al. ............................ | 428/331 |
| 4,855,180 | 8/1989 | Kawamura ............................. | 428/328 |
| 4,902,724 | 2/1990 | Moore .................................. | 522/40 |
| 4,902,725 | 2/1990 | Moore .................................. | 522/40 |
| 4,927,704 | 5/1990 | Reed et al. ............................ | 428/221 |
| 5,015,523 | 5/1991 | Kawashima et al. .................. | 428/336 |
| 5,051,308 | 9/1991 | Reed et al. ............................ | 428/412 |

OTHER PUBLICATIONS

Pp. 283 and 294 of Grant and Hackh's Chemical Dictionary, Fifth Edition.

*Primary Examiner*—D. S. Nakarani
*Attorney, Agent, or Firm*—R. Lawrence Sahr

[57] ABSTRACT

A coated plastic molded article comprising a plastic molded article on the surface of which are laminated (a) a first layer comprising a cured composition containing a partially hydrolyzed product of at least one silicon compound, (b) a second layer comprising a cured, partially hydrolyzed product of a second silicon compound, and (c) a third layer comprising silicon dioxide from an aqueous hydrosilicofluoric acid solution supersaturated with silicon dioxide, the coating layers being applied to the plastic molded article in the order stated; and alternate embodiments of a process for preparing the coated plastic molded articles.

9 Claims, 1 Drawing Sheet

COATED PLASTIC MOLDED ARTICLES

This is a Continuation of U.S. patent application Ser. No. 07/708,739 filed May 31, 1991, now abandoned.

FIELD OF THE INVENTION

This invention relates to coated plastic molded articles and processes for their preparation. More specifically, the invention relates to plastic molded articles with improved surface properties such as abrasion resistance and imperviousness to water, and a process for preparing such articles.

BACKGROUND OF THE INVENTION

Generally, plastics excel in transparency, light weight, processability and impact strength but show poor abrasion resistance and solvent resistance. Hence surfaces of plastic articles are easily injured and damaged by organic solvents. Furthermore, they have a defect of insufficient weatherability and are apt to be discolored and turn yellow in color. With the view to improve these shortcomings, various surface-modifying coatings and modifying methods have been proposed.

Japanese laid-open (kokai) Patent Publication No. 196237/1983 and 78240/1984 propose coated polycarbonate molded articles with improved abrasion resistance, which are prepared by applying onto a polycarbonate surface an undercoater containing a thermoplastic or thermosetting acrylic polymer, curing the same, and thereafter coating said surface with a composition containing a partially hydrolyzed condensate of alkyltrialkoxysilane or colloidal silica-containing organopolysiloxane, and curing the same to let it serve as the top coating layer.

However, the above polycarbonate molded articles are still insufficient in resistance to abrasion and solvents compared to inorganic materials; they show insufficient water-intercepting properties, viz., prevention of water permeation which is one of the degradation factors in such articles in weatherability tests such as outdoor exposure tests.

On the other hand, Japanese Patent Publication No. 8098/1986 and Japanese Laid-open Patent Publication No. 32133/1990 propose coating compositions and articles treated therewith, in which a coating containing a polyfunctional acrylic compound is applied onto plastic surfaces and then cured with irradiation of actinic rays.

Japanese Laid-open (Kokai) Patent Publication Nos. 1756/1983, 49036/1985, 11665/1990, 163134/1990 and 173163/1990 all disclose coating compositions containing a polyfunctional acrylic compound and silica sol, or a polyfunctional acrylic compound, silica sol and silylacrylate; or plastic coated articles on the surfaces of which the coating compositions are cured with irradiation of actinic rays.

The coated articles, prepared by applying a coating containing a polyfunctional acrylic compound on a plastic substrate and then curing the same with irradiation of actinic rays, do exhibit improved resistance properties to abrasion and solvents, which, however, are yet insufficient compared to inorganic materials. Furthermore, water-intercepting ability, viz., prevention of water permeation which is one of the degradation factors of such articles in weatherability tests such as outdoor exposure tests, is insufficient.

Japanese Laid-open International Patent Publication Nos. 500894/1980 and 500980/1880 disclose polycarbonate articles which are coated with an undercoating layer, composed of a photoreactive product of polyfunctional acrylic monomer, and a thin silicon dioxide-containing layer being vacuum evaporated on the undercoating layer. For practicing the vacuum evaporation method proposed in those International Applications, however, a vacuum-type apparatus is required for forming the silicon dioxide coating, and furthermore, it is difficult to form a uniform coating on the surface of a plastic molded article of large size or with an uneven surface using such appartus.

For forming silicon dioxide coating film, besides the above-described vacuum evaporation method or sputtering method, Japanese Laid-open (Kokai) Patent Publication No. 258480/1985 proposes a process comprising immersing a substrate material in an aqueous hydrosilicofluoric acid supersaturated with silicon dioxide to form a silicon dioxide coating on the substrate surface. (This method is hereinafter referred to as the "precipitation method".)

Japanese Laid-open (Kokai) Patent Publication No. 12734/1986 discloses a process for forming silicon dioxide film on plastic molded articles by the precipitation method, which comprises coating a plastic molded article with a silicon compound such as an organosilicon compound, hydrolyzate thereof and colloidal silica, curing the same to form a primary coating, and thereafter forming a silicon dioxide coating on said primary coating by the precipitation method.

According to this process, plastic molded articles coated with abrasion-resistant, solvent-resistant and water-impermeable silicon dioxide film can be obtained, but the use of such a process still encouters the problems to be solved, such as insufficient reproducibility in transparency and adhesion of the silicon dioxide coating so formed. That is, it is understood generally that, in cases of coating a silicon dioxide film on a surface of a plastic molded article directly by the precipitation method, the resultant silicon dioxide film shows weak adhesion and is not uniform, because aqueous hydrosilicofluoric acid solution has low reactivity with plastics and poor wetability. On the other hand, if the plastic molded article is coated in advance with an organosilicon compound and cured, the silanol groups which are present on the surface provide anchoring sites with the silicon component in the aqueous hydrosilicofluoric acid solution, and hence, it is possible to improve adhesion and unevenness of the silicon dioxide film obtained by the precipitation method. However, when a silicon dioxide coating is formed on a film prepared by coating and curing a partially hydrolyzed product of silicon compounds as above, by the precipitation method, the reproducibility of uniformity and adhesion of the silicon dioxide coating is insufficient.

An object of the present invention is to provide novel coated plastic molded articles.

A further object of the present invention is to provide coated plastic molded articles with improved abrasion resistance, weatherability, chemical resistance and imperviousness to water.

Still another object of the present invention is to provide a process for manufacturing the coated plastic molded articles of the present invention with excellent reproducibility and industrial advantage.

Other objects and advantages of the present invention will become apparent from the following descriptions.

BRIEF DESCRIPTION OF THE INVENTION

The present invention provides a coated plastic molded article comprised of a plastic article onto at least one surface of which are laminated:

(a) at least one first layer comprising a cured composition containing at least one partially hydrolyzed product of at least one silicon compound which is represented by the formula:

$R^1Si(R^2)_3$ wherein $R^1$ is a $C_1$–$C_6$ hydrocarbon group, an epoxy group-containing organic group or a fluorine atom-containing organic group, and $R^2$ is selected from the group consisting of alkoxy, alkoxyalkoxy and acetoxy groups and chlorine atoms, provided that the $R^2$ s may be the same or different;

(b) at least one second layer comprising at least one cured, partially hydrolyzed product of at least on silicon compound which is represented by the formula:

$(R^3)_nSi(R^4)_{4-n}$ wherein $R^3$ is an acryloxy group-containing organic group, a methacryloxy group-containing organic groups, an amino group-containing organic group or a chlorine-containing organic group, and $R^4$ is selected from the group consisting of alkoxy, alkoxyalkoxy and acetoxy groups, and n is 0 or 1 ; and (c) at least one third layer comprising at least a silicon dioxide from an aqueous hydrosilicofluoric acid solution supersaturated with silicon dioxide, arranged on a least one surface of the molded plastic article in the order of (a), followed by (b) then followed by (c) Preferably, an adhesive layer is present, interposed between (a), above, and the surface of the plastic molded article, and preferably that adhesive layer comprises at least one acrylic polymer and/or at least one methacrylic polymer. Also, preferably the specific plastic molded article is made of a material selected from the group consisting of polycarbonate, diethylene glyco-bisallylcarbonate polymer, acrylic resin and polyester resin.

The present invention also provides a process, for preparing the above described coated plastic molded article, which comprises:

(1) preparing a plastic molded article having a preferred adhesive layer on at least one surface thereof;

(2) Applying onto that surface a first coating containing at least one partially hydrolyzed product of at least one of the silicon compounds represented by the first formula set forth above, and curing that first coating to form a first layer;

(3) applying onto that first layer, a second coating containing at least one partially hydrolyzed product of at least one of the silicon compounds represented by the second formula set forth above, and curing that second coating to form a second layer; and (4) applying onto the surface of that second layer, an aqueous hydrosilicofluoric acid solution supersaturated with silicon dioxide to form a third layer comprising silicon dioxide. Preferably the second coating contains the partially hydrolyzed product of the silicon compound at a concentration of at least $10^3$ mol/liter, calculated as $R_nSiO_{(4-n)/2}$.

The present invention also provides another embodiment of a coated plastic molded article comprising an plastic molded article having on at least one surface thereof:

(i) a first polymer layer cured with irradiation of actinic rays;

(ii) a second layer comprising a cured, partially hydrolyzed product of at least one of the silicon compound represented by the second formula stated above; and (iii) a third layer comprising silicon dioxide from an aqueous hydrosilicofluoric acid solution supersaturated with silicon dioxide laminated together and to at least one surface of the plastic molded article in the order of (i), followed by (ii) then followed by (iii). Preferably the first layer (i) is formed by curing a polyfunctional acrylate compound with irradiation of actinic rays. Preferably, the generic plastic molded article comprises a material selected from the group consisting of polycarbonate, diethylene glycol-bis-allylcarbonate polymer, acrylic resin and polyester resin.

The present invention also provides another embodiment of a process for producing coated molded plastic molded articles comprising:

(I) preparing a plastic molded article having on at least one surface thereof a first polymer layer which has been cured with irradiation of actinic rays;

(II) applying onto the surface of that first layer at least one second coating comprising at least one partially hydrolyzed product of at least one of the silicon compounds represented by the second formula stated above, and curing the same to form a second layer; and (III) applying onto the surface of that second layer, an aqueous hydrosilicofluoric acid solution supersaturated with silicon dioxide to form a third layer comprising silicon dioxide. Preferably the first polymer layer is formed by applying an uncured precursor onto at least one surface of the plastic molded article and curing the same with irradiation of actinic rays. Alternately, or in addition, the first polymer layer may be in the form of a film. Further, it is preferred that the at least one second coating contains at least one partially hydrolyzed product of at least one silicon compound at a concentration of at least $10^3$ mol/liter, calculated as $R_nSiO_{(4-n)/2}$.

These and other features of the present invention will be more fully described in the following detailed description with reference to the accompanying drawing.

DETAILED DESCRIPTION OF THE INVENTION

Figure 1:
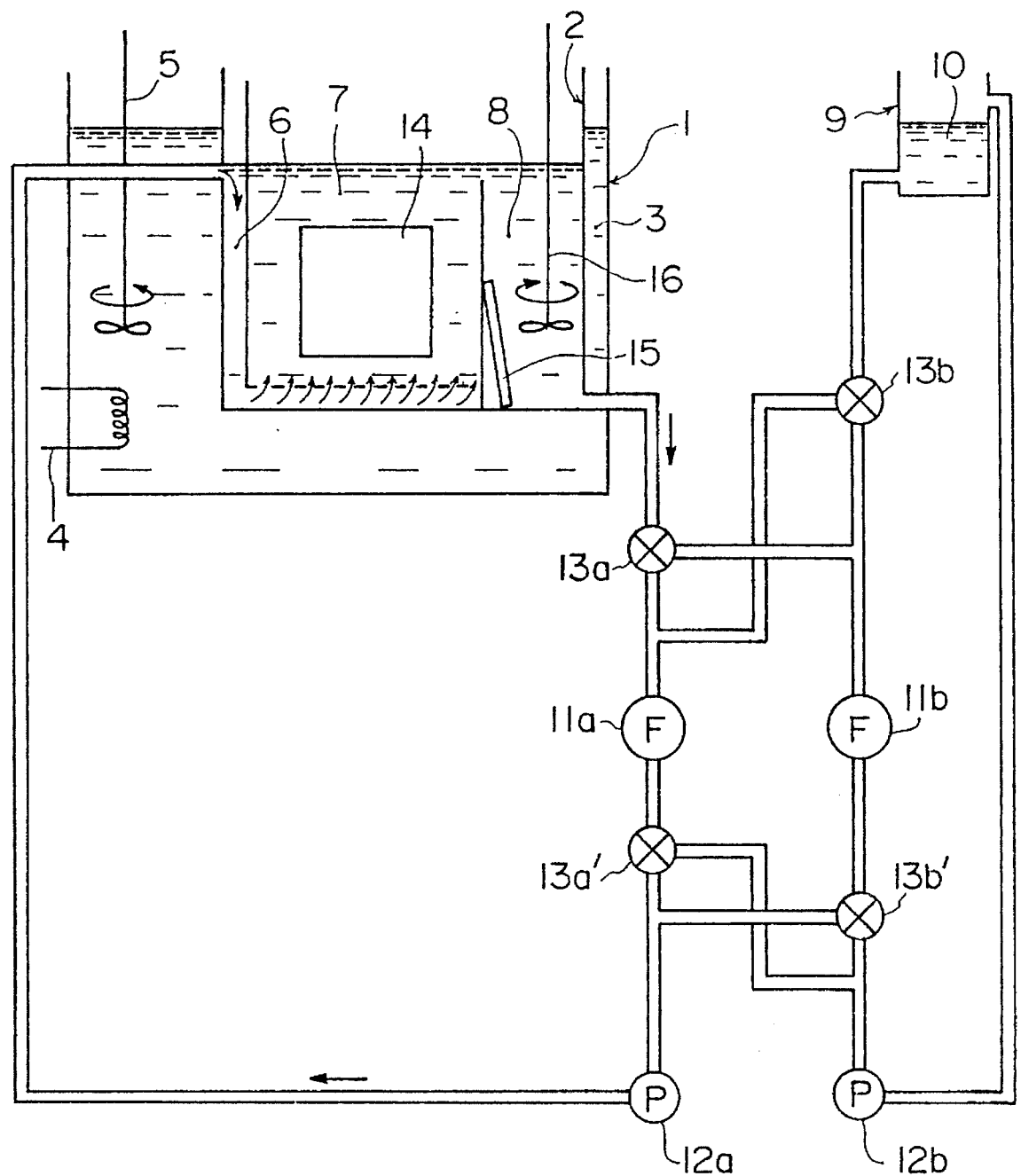
FIG. 1 shows a schematic system diagram of the preferred silicon dioxide coating apparatus useful for practicing the process of the present invention.

According to the present invention, the foregoing objects and advantage can be achieved by a preferred coated plastic molded article comprising a plastic article on the surface of which are laminated:

(a) a first layer preferably composed of a cured composition containing a partially hydrolyzed product of at least one silicon compound which is represented by the following formula (1):

$R^1Si(R^2)_3$ wherein $R^1$ is a $C_1$–$C_6$ hydrocarbon group, an epoxy group-containing organic group or a fluorine atom-containing organic group, and $R^2$ is selected from the group consisting of alkoxy, alkoxyalkoxy and acetoxy groups and at least one chlorine atom, provided that the three $R^2$s may be the same or different;

(b) a second layer composed of a cured, partially hydrolyzed product of at least one silicon compound which is represented by the following formula (2):

$$(R^3)_n Si (R^4)_{4-n}$$

wherein $R^3$ is an acryloxy group-containing organic group, a methacryloxy group-containing group, an amino group-containing organic group or a chlorine-containing group, $R^4$ is selected from the group consisting of alkoxy, alkoxyalkoxy and acetoxy groups, and n is 0 (zero) or 1; and (c) a third layer composed of the silicon dioxide from an aqueous hydrosilicofluoric acid solution supersaturated with silicon dioxide, in the order of first (a) on the surface of the plastic molded article, then (b) and then (c).

The first layer (a) of the coated plastic molded article of the present invention comprises a cured composition containing a partially hydrolyzed product of at least one silicon compound of formula (1).

In formula (1), $R^1$ is a $C_1$–$C_6$ hydrocarbon group, and preferably an epoxy group-containing organic group or a fluorine atom containing organic group may be used. Preferred examples of $R^1$ are methyl, ethyl, n-propyl, iso-propyl, n-butyl, n-pentyl, n-hexyl, vinyl, propenyl, γ-glycidoxypropyl and/or trifluoropropyl.

In formula (1), $R^2$ is preferably selected from the group consisting of alkoxy, alkoxyalkoxy and acetoxy groups and a chlorine atom. The alkoxy moiety of the alkoxy or alkoxyalkoxy group preferably contains 1 to 4 carbon atoms. As the alkoxy groups, for example, methoxy, ethoxy, propoxy and/or butoxy may be used. As the alkoxyalkoxy groups, for examples, methoxyethoxy, ethoxyethoxy and/or methoxypropoxy may be used. The three $R^2$s in general formula (1) may be the same or different.

The silicon compounds represented by formula (1) include, for example, methyltrimethoxysilane, ethyltrimethoxysilane, phenyltrimethoxysilane, vinyl(methoxyethoxy)silane, γ-glycidoxypropyltrimethoxysilane and/or γ-trifluoropropyltrimethoxysilane.

The first layer (a) comprises a cured film provided by curing a composition containing a partially hydrolyzed product of such a silicon compound or compounds and may further contain an oxide of metal such as, for example, silicon, titanium, tin, antimony, zinc and the like. The amount of such metal oxide is preferably 1 to 100 parts by weight, more preferably 3 to 100 parts by weight calculated as $R^1SiO_{1.5}$, based on 100 parts by weight of the silicon compound of formula (1).

The first layer (a) preferably has a thickness ranging from 1 to 100 μm. The first layer (a) contributes to improve surface properties of the coated plastic molded articles of the present invention, such as abrasion resistance and weatherability, in cooperation with the second and third layers which are described hereinafter.

The first layer (a) may be provided directly on the surface of the plastic molded article, or may have interposed therebetween an adhesive layer (d). The adhesive layer (d) strengthens the adhesion between the plastic molded article and the first layer (a). The adhesive layer (d) preferably is a layer containing, for example, an acrylic or methacrylic polymer. Such (meth)acrylic polymer may be any of a thermoplastic polymer, a thermoset polymer or a polymer cured with irradiation of actinic rays. Examples of such (meth) acrylic polymers include (meth)acrylic polymers having no functional group such as polyalkyl (meth) acrylic; (meth) acrylic polymers having functional groups such as hydroxyl, epoxy, alkoxysilyl, amino, carboxyl and mercapto; and (meth)acrylic polymers formed by curing polyfunctional (meth)acrylic monomers with actinic radiation. If necessary, the adhesive layer (d) may contain a crosslinking agent, ultraviolet absorbent, antioxidant or heat-stabilizer, as required.

The adhesive layer (d) has a thickness preferably ranging from 0.1 to 20 μm, more preferably from 1 to 5 μm, to optimize strength between the surface of the plastic molded article and the first layer (a). The presence of the adhesive layer (d) is particularly advantageous when the substrate is a polycarbonate molded article.

The second layer (b) of the coated plastic molded article of the present invention comprises a cured, partially hydrolyzed product of at least one silicon compound represented by the formula (2). In formula (2), $R^3$ is an organic groups preferably containing acryloxy, methacryloxy or an amino moiety or one or more chlorine atoms. Preferred examples include acryloxypropyl, methacryloxypropyl, aminopropyl and/or chloropropyl groups.

In formula (2), $R^4$ is selected from the group consisting of alkoxy, alkoxyalkoxy and acetoxy groups. For those alkoxy and alkoxyalkoxy groups, the description given as to formula (1) is perfectly applicable. In formula (2), n stands for 0 or 1. The four $R^4$s, when n is 0, or the three $R^4$s, when n is 1, may be the same or different.

Examples of the silicon compounds of formula (2) include tetramethoxysilane, tetraethoxysilane, tetraacetoxysilane, γ-methacryloxypropyltrimethoxysilane, γ-acryloxypropyltrimethoxysilane and γ-chloropropyltrimethoxysilane.

Hydrolyzates of such silicon compounds include those of the silicon compounds represented by general formula (2) in which part or all of their alkoxy, alkoxyalkoxy and/or acetoxy groups are substituted with hydroxyl groups, and those in which the substituted hydroxyls are partially condensed spontaneously. Such hydrolyzates can readily obtained by, for example, hydrolyzing the silicon compounds in a mixed solvent such as water-alcohol mixtures in the presence of an acid. These hydrolyzates may be used either singly or in combinations of two or more. In the case of concurrent use, it is preferred to use a co-hydrolyzate of a mixture of two or more of the silicon compounds of general formula (2).

The second layer (b) improves the film-forming property of the third layer (c) which is formed on the second layer (b). When a plastic molded article, on which the third layer (c) is to be formed with the omission of the second layer (b), and a sheet glass substrate, are simultaneously coated with silicon dioxide by the precipitation method, the silicon dioxide film formed on the plastic molded article, forming the third layer, tends to leave less thickness than that on the sheet glass substrate, and/or to show less film uniformity. Formation of the second layer (b) renders the surface of the plastic molded article, before coating with the silicon dioxide third layer by the precipitation method, to be a close resemblance of a glass surface, removing such drawbacks; it is unlikely that this intended effect can be obtained unless a cured, partially hydrolyzed product of the silicon compound(s) of general formula (2) is (are) used.

The second layer (b) preferably has a thickness ranging from about 1 to 100 nm, more preferably from about 3 to 10 nm. Too great of a thickness is apt to cause the occurrence of cracks and, therefore, should be avoided.

The third layer (c) of the coated plastic molded article of the present invention comprises silicon dioxide from an aqueous hydrosilicofluoric acid solution supersaturated with silicon dioxide. The third layer (c) can be readily formed by applying the aqueous hydrosilicofluoric acid solution onto the second layer (b), as is hereinafter described in detail. The third layer (c) preferably has a thickness ranging from 30 to 3,000 nm, more preferably from 50 to 500 nm.

Plastic molded articles which can be used as substrates for the coated plastic molded articles of the present invention may be made, for example, of polycarbonate, diethylene glycol-bis-allylcarbonate polymer, acrylic resin or polyester resin.

The coated plastic molded articles of the present invention can be advantageously prepared by a process of the present invention which comprises:

(1) preparing a plastic molded article optionally having an adhesive layer (d) on its surface;

(2) applying onto that surface a first coating composition containing a partially hydrolyzed product of at least one of the silicon compounds represented by formula (1), and curing the same, to form a first layer (a);

(3) applying onto the surface of the first layer (a) a second coating containing a partially hydrolyzed product of at least one of the silicon compounds represented by second formula (2), and curing the same, to form a second layer (b); and (4) applying onto the surface of the second layer (b) an aqueous hydrosilicofluoric acid solution supersaturated with silicon dioxide.

In the above step (1) of the just described process of the present invention, a plastic molded article is prepared which may, or may not, have on its surface and adhesive layer (d). A plastic molded article having an adhesive layer (d) can be obtained by applying onto a plastic article substrate an adhesive such as a coating containing acrylic polymer, methacrylic polymer, acrylic monomer, methacrylic monomer, acrylic oligomer or methacrylic oligomer, by such means as, for examples, dipping, spraying, roller coating, flow-coating, spin-coating, etc. followed by heating or irradiation with actinic rays. Such adhesive layers (d) serve to promote adhesion of the first layer (a), which is formed by curing a coating containing a partially hydrolyzed product of at least one silicon compound of formula (1), onto the plastic molded article substrate. As previously stated, the thickness of the adhesive layer (d) preferably ranges from 0.1 to 20 μm, more preferably from 1 to 5 μm.

In subsequent step (2) of that just described process, a first coating containing a partially hydrolyzed product of at least one silicon compound of formula (1) is applied onto the surface of either adhesive layer (d) or directly onto the surface of the plastic molded article as prepared by step (1), and cured to form first layer (a). The first coating may further contain silicon compound(s) other than those of formula (1), or various metal oxides such as oxide sols of silicon, titanium, tin, antimony, zinc and the like. For example, coatings containing a co-hydrolyzate of methyltrimethoxysilane and colloidal silica or a ternary cohydrolyzate of γ-glycidoxypropyltrimethoxysilane, phenyltrimethoxysilane and antimony pentoxide sol can be used. The first layer (a) can be formed by applying such first coating containing a partially hydrolyzed product of at least one silicon compound of general formula (1) and, if necessary, a curing catalyst, onto at least one surface of the plastic molded article optionally having an adhesive layer already in place thereon, in a manner similar to that described for application of adhesive layer (d), followed by heating at, for example, 120° C., to cure that first coating. As described above, first layer (a) preferably has a thickness ranging from 1 to 10 μm, more preferably 2 to 5 μm. This first layer (a) is necessary for improving abrasion resistance and weatherability of the plastic molded article in cooperation with second layer (b) and third layer (c), as hereinafter described.

In step (3) of that just described process, a second coating containing a partially hydrolyzed product of at least one silicon compound of formula (2) is applied onto the surface of first layer (a), and cured to form a second layer (b). Second layer (b) assists subsequent formation of a strongly adhering and uniform silicon dioxide coating, viz., a third layer (c), thereon.

The second coating contains the partially hydrolyzed product of at least one silicon compound of formula (2) preferably at a concentration of at least $10^{-3}$ mol/liter, calculated as $R_nSiO_{(4-n)/s}$; when the concentration is lower than $10^{-3}$ mol/liter, it becomes difficult to achieve the intended effect in regard to the second layer (b). The minimum preferred thickness of the so obtained second layer (b) is approximately 5 nm, when measured by a method of laminating second layer (b) multiple times on a sheet glass substrate under identical conditions and calculating the thickness per single layer. On the other hand, the maximum thickness of second layer (b) is preferably about 100 nm; thicknesses exceeding this preferred maximum value are not desirable, because such appear to enhance the occurrence of cracks.

In step (4), an aqueous hydrosilicofluoric acid solution supersaturated with silicon dioxide is applied onto the surface of second layer (b) to form a third layer (c) comprising silicon dioxide. Such aqueous hydrosilicofluoric acid solution supersaturated with silicon dioxide (hereinafter referred to as "treating solution") can be prepared by dissolving silicon dioxide (silica gel, aerosil, silica glass frit or other silicon dioxide-containing material) in an aqueous hydrosilicofluoric acid solution and, thereafter, bringing about supersaturation with silicon dioxide by such means as adding water or a reagent (boric acid, aluminum chloride, aluminum metal, etc.) and/or raising the temperature of the treating solution.

Treating solutions containing the solute at a concentration ranging from 1 to 4 mol/liter are preferred. Those prepared by saturating an aqueous hydrosilicofluoric acid solution containing the solute at a concentration higher than 4 mol/liter with silicon dioxide and then diluting the same with water to adjust the concentration to 1 to 4 mol/liter are especially preferred, because they enable a high film-forming rate, thus allowing a more efficient coating operation. The third coating layer (c) so formed preferably has a thickness ranging from 50 to 500 nm.

It is also preferred that the treating solution continuously have added thereto and mixed therewith (i) additives such as aqueous solutions of boric acid, aluminum chloride, etc., and (ii) metals such as aluminum powder or thin aluminum sheets to be dissolved in the treating solution; (iii) that the treating solution constantly be maintained in the supersaturated condition by such means as temporarily lowering the temperature to bring about saturation of the silicon dioxide followed by raising the temperature, even during the application thereof to the plastic molded article; and (iv) that at least 3% per minute of the total amount of the treating solution be filtered and returned to the system. Such continuous addition and mixing of an aqueous solution of, for example, boric acid or the like (i) and dissolving and mixing a metal such as, for example, aluminum (ii) during the contact of the treating solution with the plastic molded article contribute to improving the rate of film formation. Boric acid is added preferably in an amount ranging from $5\times10^{-4}$ mol/hr to $1\times10^{-3}$ mol/hr, per mol of hydrosilicofluoric acid in the treating solution. Aluminum metal is dissolved preferably in an amount ranging from $1\times10^{-3}$ mol/hr to $4\times10^{-3}$ mol/hr, per mol of hydrosilicofluoric acid in the treating solution. The circulation of at least 3% of the treating solution is effective for continuously maintaining a uniformity in the coating thickness, and filtration of the treating solution through a filter is desirable for maintaining the coating free of surface unevenness.

When the molded plastic articles are dipped in a tank filled with the treating solution, an even and uniform coating can be effectively achieved by flowing the treating solution over the surface in a laminar flow pattern as, for example, may be achieved by multiple dipping and withdrawing or by some agitation of the treating solution in the tank.

Referring to FIG. 1, a dipping tank is shown comprising an outer tank 1 and an inner tank 2. The space between the tanks 1 and 2 is filled with water 3 which is heated with heater 4 to be maintained at a fixed temperature and stirred with stirrer 5 to obtain an uniform temperature distribution.

Inner tank 2 comprises front part 6, central part 7 and back part 8, with inner tank 2 being filled with a treating solution, for example, 6.5 liters thereof of at a prescribed concentration, containing silicon dioxide dissolved therein to the saturation point. Preferably, industrial silica gel powder is used as the source of silicon dioxide supply.

Three-way cocks 13a, 13a', 13b and 13b'are adjusted to actuate a circulation pump 12a, so as to start recirculation of the treating solution by pumping up the treating solution in the back part 8 of inner tank 2 at a fixed rate, filtering the treating solution through a filter 11a and recirculating the treating solution to the inner tank 2. The mesh size of filter 11a is, for example 1.5 μm, and the recirculation rate of the treating solution is set to be, for example, 520 ml/min; because the exemplified total amount of the treating solution is 6.5 liters, the circulation flow rate is approximately 8%/min.

Metal, for example three aluminum sheets 15, being 50 mm ×50 mm×3 mm in size, are dipped in back part 8 of inner tank 2. Dissolution of aluminum sheets 15 is promoted by operation of stirrer 16.

By maintaining the system of FIG. 1 under such conditions for 16–30 hours, the aqueous hydrosilicofluoric acid solution is converted into a treating solution, of the appropriate concentration and silicon dioxide saturation, capable of forming silicon dioxide film. When the treating solution becomes capable of forming silicon dioxide film, particulate silicon dioxide starts to form in the solution, grows and is filtered off at filter 11a, which tends to clog filter 11a. This tendency becomes observable at 30–50 hours after addition of the aluminum sheets 15, which suggests reduction in the recirculation rate. However, in such a case, after the treating solution in the piping and filter 11a is returned to inner tank 2, three-way cocks 13a, 13a', 13b and 13b'are re-set such that circulation of the treating solution is now from back part 8 of inner tank 2 to filter 11b, then to circulation pump 12a and then to front part 6 of inner tank 2. When recirculation of the solution is so re-started, the circulation rate recovers to the exemplified 520 ml/min again. The mesh size of filter 11b is preferably the same as that of filter 11a, e.g., 1.5 μm.

After the re-setting of cocks 13a, 13a', 13b and 13b', as described above, circulation pump 12b is actuated under the described conditions to circulate a 5% aqueous hydrosilicofluoric acid solution 10 from washing liquid tank 9 to filter 11a, then to circulation pump 12b and finally back to washing liquid tank 9. Thus, clogged filter 11a can be backwashed and thereby regenerated for further use. Following the above sequence of procedures, every time the filter clogging tendency is observed, in either filter 11a or 11b, the three-way cocks 13a, 13a', 13b and 13b' may be re-set to flow the treating solution through the un-clogged filter while backwashing the clogged filter. In the meantime, silicon dioxide coating can be continuously generated by dipping sheet glass of plastic molded articles with various silicon compounds in the central part 7 of inner tank 2 for a prescribed length of time, for example, 0.5 to 24 hours.

It has been found that when the first layer (a) of the coated plastic molded article of the present invention is replaced by a polymer layer cured with irradiation of actinic rays (first polymer layer on a hard coating layer), coated plastic molded articles exhibiting excellent surface characteristics can be obtained, equivalent to those where first layer (a) is utilized, exhibiting, for example, equivalent high abrasion resistance. Accordingly, the present invention also provides a coated plastic molded article comprising a plastic molded article preferably having on at least one surface thereof;

(a') a first polymer layer cured with irradiation of actinic rays;

(b) a second layer comprising a cured, partially hydrolyzed product of at least one silicon compound represented by formula (2); and (c) a third layer comprising silicon dioxide from an aqueous hydrosilicofluoric acid solution supersaturated with silicon dioxide, in the order of first (a ') on at least one surface of the plastic molded article, then (b) and then (c); (this coated plastic molded article will hereinafter be referred to as a "second coated plastic molded article".)

The first polymer layer (a') of the second coated plastic molded article is a polymer layer cured with irradiation of actinic rays. It is preferred that the cured polymer layer is a coated film of polyfunctional acrylate compound which has been cured with irradiation of actinic rays. Examples of preferred useful polyfunctional acrylate compounds are polyfunctional acrylic compounds per se or those further containing at least one of fine particles of metal oxide, silyl acrylate and/or silyl metacrylate. Suitable polyfunctional acrylic compounds are monomers or oligomers containing at least two acryloyloxy or methacryloyloxy groups per molecule. Examples are polyol acrylates such as neopentylglycol diacrylate, trimethylolpropane triacrylate and pentaerythritol tetramethacrylate; polyester acrylates such as α,ω-tetraacryl-bis-trimethylolpropane tetrahydrophthalate and α,ω-dimethyacryl-bis-ethyleneglycol phthalate; urethane acrylates such as reaction products of toluene diisocyanate, isophorone diisocyante or the like with 2-hydroxyethyl acrylate, and reaction products of hexanediol with isophorone diisocyante and 2-hydroxyethyl acrylate; epoxy acrylates such as diacrylate of bisphenol A diglycidylether and trimethylolpropane polyglycidylether polyacrylate; and other polyfunctional acrylates such as spiroglycol diglycidylether diacrylate; silicone acrylate and tris-acryloyloxyethylisocyanurate.

Fine particles of metal oxides may be used in the first polymer layer (a'). Examples are oxides of such metals as silicon, titanium, tin, antimony, cerium, zirconium and zinc. Preferably, fine particles with diameters ranging from 5–100 nm, or their sols, are used.

Silyl acrylate and/or silyl methacrylate may also be used in the first polymer layer (a'), as such, or in combination with the just described fine particles of metal oxides; examples of preferred silyl acrylates and silyl methacrylates are γ-methacryloxypropyltrimetoxysilane, γ-acryloxypropyl trimethoxysilane or the like.

It is preferred that the further contents of the polyfunctional acrylate compounds, those being at least one of fine particles of metal oxide, silyl acrylate and/or silyl metacrylate, are contained in the amount in total ranging from 5 to 80% by weight of the polyfunctional acrylic compound contained in the polyfunctional acrylate compound being used.

To better enable formation of the first polymer layer (a'), the coating composition may optionally contain additional components as necessity demands. For example, monofunctional acrylate and/or methacrylate may be added to impart flexibility and adhesiveness to the cross-linked and cured coating. The amount of such optional components is preferably from 2 to 50% by weight of the sum of the polyfunctional acrylic compound (contained in the polyfunctional acrylate compound being use), and its further contents, those being at least one of fine particles of metal oxide, silyl acrylate and/or silyl metacrylate. Also, to enhance the improvement of surface smoothness and to reduce frictional resistance of the first polymer layer (a'), the addition of at least one silicon-containing and/or fluorine-containing surface active agent is desirable. The first polymer layer (a') preferably has a thickness ranging from 1 to 50 μm, more preferably from 2 to 30 μm.

As for the second layer (b) and the third layer (c) of the second coated plastic molded articles, they are the same or equivalent, respectively, to the second layer (b) and third layer (c) of the hereinabove first described coated plastic molded articles.

According to the present invention, the second coated plastic molded articles, described above, can be prepared by a process which comprises:

(1') preparing a plastic molded article having on its surface a first polymer layer which has been cured with irradiation of actinic rays;

(2) applying, onto the surface of that first layer, a second coating containing a partially hydrolyzed product of at least one of the silicon compounds represented by formula (2), and curing the same, to form a second layer; and (3) applying, onto the surface of the second layer, an aqueous hydrosilicofluoric acid solution supersaturated with silicon dioxide to form a third layer comprising silicon dioxide.

In step (1') above, a plastic molded article having on its surface a first polymer layer (a') which has been cured with irradiation of actinic rays is prepared. The first polymer layer (a') can be formed by applying onto the surface of the molded plastic article a substrate precursor not yet cured and irradiating that surface with actinic rays, or a film which has been cured in advance with irradiation of actinic rays may be applied onto the surface of that plastic article; a combination of the two may also be used.

When curing by irradiation of actinic rays, if necessary, a photopolymerization initiator may be added to the coating composition (the precursor). Specific examples of useful photopolymerization initiators include carbonyl compounds such as acetophenone, benzophenone, Michler's ketone, benzil, benzoin, benzoinalkylether and benzyldimethylketal; sulfur compounds such as tetramethylthiuram monosulfide and thioxanthone; azo compounds such as azobisisobutyronitrile and anzobis-2,4-dimethylvaleronitrile; and peroxide compounds such as benzoyl peroxide and ditertiary butyl peroxide. These photopolymerization initiators may be used singly or in combination of two or more. Normally the initiator is used in an amount of 0.1 to 5% by weight of the coating composition.

An organic solvent may further be added to the coating composition for the purpose of improving applicability, uniform film-forming capability and/or adhesion. Specific examples of useful organic solvents include alcohols such as ethanol and isobutyl alcohol; aromatic hydrocarbons such as benzene, toluene and xylene; ketones such as acetone and methyl ethyl ketone; ethers such as dioxane; and ethers such as ethylyl acetate. The amount of such organic solvent to be added is preferably 10 to 200% by weight of the vehicle. The coating compositions may further contain other additives such as UV absorber, photostabilizers and antioxidants.

As previously stated, by applying a coating composition for forming the first polymer layer (a') which is to be cured with irradiation of actinic rays, viz., the hard coating of the film onto a plastic molded article by such means as dipping, spraying, spin coating, roller coating or flow coating, and after drying and irradiating with actinic rays, a plastic molded article coated with the cured hard film is obtained. When a plastic molded article having the first polymer layer (a') is to be formed by casting, the coating composition may be applied onto the inner surface of the casting die or mold, by such means as those just mentioned above, then dried and cured with irradiation of actinic rays to form a cured film in situ. During or after the cast polymerization, the film is transferred onto the cast polymerized plastic substrate to provide a plastic molded article coated with film, the first polymer layer (a'), as removed from the mold.

In the present invention, as actinic rays, electron beam rays, α-rays, β-rays, γ-rays and ultraviolet rays are useful. Economically, ultraviolet ray irradiation is preferred.

The first polymer layer (a') contributes to improve the abrasion resistance and weatherability of the second coated plastic molded article of the present invention.

Steps (2) and (3) of the above process for preparing the second coated plastic molded articles are identical to or equivalent to those also described above for the first process for preparation of the first described coated plastic molded articles.

Thus, either of the two coated plastic articles of the present invention exhibits the following excellent properties:

(1) they both have coatings far excelling in durability compared to silicon dioxide formed on the surface of plastic molded articles by such means as vacuum evaporation or sputtering;

(2) The second layer (a) improves the film-forming ability of silicon dioxide by the precipitation method, to give silicon dioxide coatings of superior uniformity. Also three layers as a whole exhibit excellent transparency; and (3) The construction of the resultant coating, including the silicon dioxide film as the top layer, improves the defects otherwise inherent in plastic, such as poor abrasion resistance, relatively poor weatherability, relatively poor chemical resistance, and relatively low imperviousness to water.

Hereinafter the present invention will be explained in further detail with reference to working examples, it being understood that the present invention is in no sense limited to those examples. The parts and percentages in the examples are by weight unless otherwise specified.

The performance of each coating was evaluated by the following methods:

Abrasion resistance: The Taber abrasion test was conducted in accordance with ASTM D-1044. The wheel employed was a CS-10F, and the load and wheel speed were 500 g and 500 rpm, respectively. Adhesion: A test normally referred to as a cross-cut tape test was conducted. A piece of adhesive cellophane tape was adhered on each coating specimen, then cross-cut at its surface in a checker board pattern, then peeled off. The peeling condition of the cut portion of the coating was evaluated, e.g., whether or not it peeled off when the tape was removed.

Water absorption: A test as prescribed in ASTM D-570 was conducted. A test sample of each coating was dried at 50° C. for 24 hours and thereafter immersed in distilled water for 24 hours. The water absorption was determined from the weight variation from before to after immersion in the distilled water.

EXAMPLE 1

(1) Polymethylmethacrylate (PMMA, a product of Aldrich Co., having a weighted average molecular weight of approximately 100,000) was dissolved in 1:1 (by weight) of a mixed solvent of diactone alcohol and ethyl cellosolve such that the mixture had a solid content of about 10%. To the solution mixture was added cyanoacrylate-containing Uvinal N-536 (a product of GAF Co.) in a ratio of approximately 20% to PMMA, to form a coating d-1.

(2) 60 parts of γ-glycidoxypropyl trimetoxysilane, 173 parts of methyltrimethoxysilane, 71 parts of colloidal silica (a product of Nissan Chemical Industries, "Snowtex-C", solid content 20%) and 190 parts of 0.1N aqueous acetic acid were mixed, and hydrolyzed for 2 hours at 80°–85° C. under reflux. The solid composition (calculated values) in the resultant solution contained 8.6% γ-glycidoxypropyl trimethoxysilane hydrolyzate calculated as

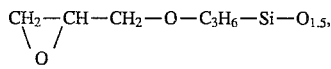

17.3% methyltrimethoxysilane hydrolyzate calculated as $CH_3SiO_{1.5}$ and 2.9% of colloidal silica calculated as $SiO_2$. To 450 Parts of the thus obtained ternary co-hydrolyzate solution, 42 parts of ethyl cellosolve, 1.0 parts of sodium acetate and a minor amount of a flow controlling agent were added to provide a coating a-1.

(3) While mixing 100 parts of tetraethoxysilane with 100 parts of distilled water, 0.5 ml of 0.1N hydrochloric acid was added to the system, followed by 30 minutes of stirring to provide a homogeneous solution. Two (2) parts of this hydrolyzate solution were diluted with 250 ml of isopropyl alcohol to provide a coating b-1 (solid concentration as converted $SiO_2$: approx. $1.9 \times 10^{-2}$ mol/liter).

(4) Onto a previously cleaned polycarbonate substrate the coating d-1 was applied and dried for 30 minutes by heating in a hot air oven at 120° C. The formed coating had a thickness of about 2 μm. Then onto the polycarbonate sheet thus coated with an adhesive layer coating a-1 was applied and dried for an hour in a hot air oven at 120° C. to provide a cured coating. The thus formed first layer had a thickness of approximately 3 μm. This dual layer coated polycarbonate sheet was dipped in coating b-1 and withdrawn at a rate of 15 cm/min, followed by 30 minutes of drying in a warm air oven at 50° C. to form a second layer onto the first layer. When ten (10) layers of the second layer were laminated onto a sheet glass substrate under identical conditions with those of the foregoing, the laminated coatings had a total thickness of about 50 nm. Therefore, the second layer formed on the first layer was presumed to have a thickness of about 5 nm.

(5) The resultant polycarbonate sheet on which the adhesive layer, then the first layer and then the second layer were laminated, in that order, was immersed, along with a sheet glass substrate, into central part 7 of inner tank 2 of the silicon dioxide coating formation apparatus as diagrammed in FIG. 1, and maintained therein for 80 minutes. Thus, a silicon dioxide coating was formed on both the polycarbonate sheet and the glass substrate. The concentration of the aqueous hydrosilicofluoric acid which was circulated through the apparatus was 2.5 mol/liter, and heater 4 was controlled so as to maintain a temperature of 35° C. during the formation of the silicon dioxide film. When the thickness of the silicon dioxide coatings on the polycarbonate sheet and the glass substrate were measured, they were both found to be about 100 nm. It was confirmed by X-ray photoelectronic spectroscopy (ESCA: Electron Spectroscopy for Chemical Analysis) that both coatings were substantially $SiO_2$. The coating on the polycarbonate sheet exhibited strong adhesion, showing no peeling off in the prescribed adhesion test. The increase in haze value after the Taber abrasion test, of the silicon dioxide coated polycarbonate sheet, was by about 6%, and the water absorption was so low as to be only about 0.04%.

EXAMPLE 2

(1) A mixture of 250 parts of methyl methacrylate, 110 parts of 2-hydroxyethyl methacrylate, 1,450 parts of ethyl cellosolve and a minor amount of an initiator were subjected to polymerization in a nitrogen atmosphere during stirring, for about 20 hours at 80° C. and for an additional 4 hours at 90° C. After cooling the system to room temperature, 1,000 parts of ethyl cellosolve were added to form a binary copolymer with a solid content of about 13%. The copolymer had a weighted average molecular weight of about 300,000. To 80 parts of the thus obtained copolymer solution, 97 parts of diacetone alcohol and 70 parts of ethyl cellosolve were added to form coating d-2.

(2) To a liquid mixture of 110 parts of methyltrimethoxysilane with 2.0 parts of glacial acetic acid, were added 180 parts of colloidal silica (product of Nissan Chemical Industries, "Snowtex-C", solid content: 20%), followed by 4 hours of stirring to effect hydrolysis. The solid composition (calculated values) of the resultant solution contained 18.5% of methyltrimethoxysilane hydrolyzate calculated as $CH_3SiO_{1.5}$ and 12.3 of colloidal silica calculated as $SiO_2$. To 300 parts of this resultant binary co-hydrolyzed solution, 150 parts of isopropyl alcohol were added and the resultant system was aged for about 4 days at room temperature. Coating a-2 was provided by then adding 0.5 parts of sodium acetate to the system.

(3) Two (2) parts of a hydrolyzate solution containing tetraethoxysilane as one of the components (solid concentration: 8 %, "CSGL-0803" manufactured by Chisso K.K.) were dissolved in 400 ml of isopropyl alcohol and 100 ml of 1-butylalcohol to provide coating b-2 (solid concentration as converted to $SiO_2$: about $2.7 \times 10^{-3}$ mol/liter).

(4) The same operations as those described in steps (4) and (5) of EXAMPLE 1 were used, with the exception that coatings d-2, a-2 and b-2 were used and the concentration of the aqueous hydrosilicofluoric acid used for forming a silicon dioxide coating by the precipitation method was set at 3 mol/liter. A previously cleaned polycarbonate substrate was thus coated. The silicon dioxide coating was formed on the polycarbonate substrate under such conditions as would form a 100 nm thick silicon dioxide coating of the same thickness on a sheet glass substrate. On presumption, based on the analogy described in EXAMPLE 1, the silicon dioxide film formed on the polycarbonate substrate had a thickness of 100 nm. Water absorption was only 0.03%. The adhesion did not change, in comparison to that of EXAMPLE 1, even when the silicon dioxide coated polycarbonate was immersed in boiling water for one hour.

EXAMPLE 3

(1) Added to 900 parts of ethyl cellosolve, which was maintained at 85° C. in a nitrogen atmosphere, was a mixture of 480 parts of methyl methacrylate, 120 parts of γ-methacryloxypropyltrimethoxysilane and 3.0 parts of benzoyl peroxide, the mixture being added over a period of 3 hours. The temperature was then raised to 105° C. and maintained for 4 hours, resulting in a copolymer with a weighted average molecular weight of about 110,000. To 80 parts of this copolymer were added 160 parts of diacetone alcohol and 150 parts of ethyl cellosolve to produce coating d-3.

(2) A previously cleaned polycarbonate substrate was coated in a manner equivalent to that described in EXAMPLE 2, the difference being that coating d-2 of EXAMPLE 2 was replaced by coating d-3. The resultant coated polycarbonate article exhibited favorable properties equivalent to those of the EXAMPLE 2 product.

EXAMPLE 4

(1) 50 parts of ethylene glycol diacrylate, 50 parts of pentaerythritol triacrylate, 2 parts of α,α-diethoxyacetophenone, 5 parts of resorcinol monobenzoate and a minor amount of a silicone-type flow controlling agent were mixed to provide coating d-4.

(2) Coating d-4 was applied onto a previously cleaned polycarbonate substrate, with a bar coater, to a wet coating thickness of about 10 μm, and cured with UV irradiation for about 1 minute using an 80 W/cm UV lamp in a nitrogen atmosphere. With these changes, the steps of EXAMPLE 1 were otherwise repeated. The resultant coated polycarbonate article exhibited equivalent favorable properties in comparison to those of the EXAMPLE 1 product.

EXAMPLE 5

EXAMPLE 2 was repeated except that the polycarbonate substrate was immersed, in the treating solution, in central part 7 of inner tank 2 of the silicon dioxide film forming apparatus diagrammed in FIG. 1, for 240 minutes. The resultant silicon dioxide coating had a thickness of about 300 nm. The resultant coated polycarbonate article exhibited excellent appearance and the increase in haze value, after the Taber abrasion test, was about 5%. The water absorption was extremely low, being only about 0.02%, which, even after a 300 hour water immersion test, only increased to about 0.08%. When the silicon dioxide coated polycarbonate sheet was immersed in boiling water for an hour, no change was observed in appearance or adhesion.

EXAMPLE 6

Coating d-2 was applied onto a previously cleaned cast plate of acrylic resin and dried by heating at 100° C. for 60 minutes in a hot air oven. The thickness of the resultant adhesive coating was about μm. Coating a-2 was then applied onto the adhesive layer coated acrylic plate and dried at 100° C. for 2 hours in a hot air oven to cure, forming a first layer. The cured first layer coating had a thickness of approximately 3 μm. Then the adhesive layer and first layer coated acrylic plate was immersed in coating b-2 and withdrawn, at a rate of 15 cm/min, and dried for 30 minute at 50° C. in a warm air oven to form a second layer. When ten applications of this same second layer were laminated onto a sheet glass substrate under identical conditions, the laminate had a thickness of about 50 nm. Accordingly, the second layer on the acrylic plate was presumed to have a thickness of about 5 nm. Then the acrylic plate, with firstly the adhesive layer, followed by the first layer and then by the second layer, in the order stated, were immersed, along with a sheet glass substrate, into central part 7 of inner tank 2 of the silicon dioxide coating forming apparatus diagrammed in FIG. 1, and maintained therein for 80 minutes to form silicon dioxide coatings on both the acrylic plate and the sheet glass substrate. The concentration of the aqueous hydrosilicofluoric acid solution which was circulated through the apparatus was 2.5 mol/liter, and heater 4 was adjusted to maintain a temperature of 35° C. during the formation of the silicon dioxide coating films. The silicon dioxide coatings formed on both the acrylic plate and the sheet glass substrate were both 100 nm in thickness. The coating formed on the acrylic plate exhibited a high adhesion strength and showed no peeling off during the adhesion test. The increase in haze value of the silicon dioxide coated acrylic plate after the Taber abrasion test was about 5%.

EXAMPLE 7

Coating a-1 was directly applied onto a previously cleaned acrylic plate, formed by extrusion, without first forming an adhesive layer, and dried at 90° C. for 3 hours in a hot air oven. The thickness of the resultant coating was about 3 μm. This monolayer coated acrylic plate was then treated as described in EXAMPLE 6 to form a second layer and a silicon dioxide third layer. The coating obtained on the extruded acrylic plate was equivalent in performance to that of the product of EXAMPLE 6.

CONTROL 1

EXAMPLE 1 was repeated except that the d-1 adhesive layer and the a-1 coating layer were omitted. The resultant dual layer coated polycarbonate molded article was transparent and exhibited no abnormality in external appearance, but the coating peeled off during the Taber abrasion test. Also, the Taber abrasion hardness was very poor.

CONTROL 2

EXAMPLE 2 was repeated except that the formation of the second layer and the third silicon dioxide layer were omitted. The resultant dual layer coated polycarbonate article was transparent, and had a good external appearance, but its water absorption was about 0.32%, approximately the same as untreated polycarbonate material. The increase in haze value after the Taber abrasion test was about 9%.

CONTROL 3

EXAMPLE 5 was repeated except that the formation of coating b-2 was omitted. A part of the silicon dioxide film top layer, on the polycarbonate article, was uneven in flatness. The adhesion of this top layer was also insufficient.

EXAMPLE 8

Onto the surface of an acrylic plate of about 2 mm×10 cm×10 cm in size, formed by extrusion and cleaned in advance, was formed a UV curable coating consisting of a polyfunctional acrylate compound ("Hardic RD-5001", manufactured by Dainippon Ink and Chemicals, Inc.). This coating was applied by a dipping method and dried at 60° C. for 5 minutes. Then the surface was irradiated with an 80 W/cm ozone type high pressure mercury vapor lamp for 10 seconds in a nitrogen atmosphere to cure the coating, with the distance between the work and the lamp set to be 15 cm. The UV cured first layer had a thickness of about 7 μm. The acrylic plate was then immersed in coating b-1 and a second layer was formed in accord with EXAMPLE 1. The resultant acrylic plate, onto which the first layer, then the second layer had been coated, in that order, was immersed, along with a sheet glass substrate, into central part 7 of inner tank 2 of the silicon dioxide film forming apparatus diagrammed in FIG. 1, and maintained there for 80 minutes to form a silicon dioxide third layer. The concentration of the aqueous hydrosilicofluoric acid solution which was circulated through the silicon dioxide film forming apparatus was 3 mol/liter, and heater 4 was adjusted so as to maintain the temperature, during film formation, at 35° C. The silicon dioxide coatings formed on both the acrylic plate and the sheet glass substrate had a thickness of about 100 nm. The coatings were analyzed by X-ray photoelectronic spectroscopy and confirmed to be substantially composed of $SiO_2$. The silicon dioxide coating formed on the acrylic plate exhibited strong adhesion in that no peeling off occurred during the cross-cut tape test. Even after immersion in 60° C. warm water for 20 hours, the silicon dioxide coated acrylic plate exhibited equally strong adhesion. The increase in haze value, after the Taber abrasion test, was about 15%, and the water absorption was so low as to be only about 0.05%. Light transmittance (visible light) exhibited by the untreated acrylic plate and the silicon dioxide coated plate were about the same, thus it was confirmed that, for the coating composed of the first, second and third layers, there was little interference with visible light transmission, and the coated product was highly transparent.

EXAMPLE 9

Onto the previously cleaned surface of an acrylic plate, formed by extrusion, a UV curable coating was formed, composed of a polyfunctional acrylate compound ("Seika Beam PHC-2210", a product of Dainichi Seika K.K.), applied by a dipping method and dried at 60° C. for 30 seconds, followed by an irradiation with a 80 W/cm ozone type high pressure mercury vapor lamp for 5 seconds in a nitrogen atmosphere, with the distance between the work and the lamp being set to be 15 cm. The resultant UV cured coating, providing the first layer, had a thickness of about 3 μm. The acrylic plate, with the first layer so formed thereon, was then immersed in coating b-2, to form a second layer onto the first layer, in accord with EXAMPLE 1. The acrylic plate, with the first and second layers formed thereon in the order stated, was then immersed in central part 7 of inner tank 2 of the silicon dioxide film forming apparatus as diagrammed in FIG. 1 and maintained therein for 100 minutes, whereby about a 120 nm thickness coating of silicon dioxide was formed. The concentration of the aqueous hydrosilicofluoric acid, which was circulated through the silicon dioxide film forming apparatus, was 3 mol/liter, and heater 4 was adjusted to maintain the temperature during film formation at 35° C. The resultant silicon dioxide coated acrylic plate exhibited strong adhesion as determined by no peeling off with the cross-cut tape of the adhesion test; there was no change in regard to adhesion after the plate was immersed in 60° C. water for 20 hours. The increase in haze value of the silicon dioxide coated acrylic plate, after the Taber abrasion test, was about 12%, and the water absorption was so low as to be only about 0.04%.

EXAMPLE 10

A UV curable coating was formulated by mixing together 100 parts of t-butanol, 20 parts of methanol silica sol (a product of Nissan Chemicals Co.), 3 parts of γ-methacryloxypropyltrimethoxysilane and 1 part of distilled water, heating and refluxing the mixture for about 10 minutes. Then 10 parts of hexanediol diacrylate and 10 parts of trimethylolpropane triacrylate were added to the mixture, Under a reduced pressure (partial vacuum), about half of the solvent was distilled off, and then 2 parts of 2,2-diethoxyacetophenone were added to 100 parts of the remaining mixture to provide a UV curable coating. This UV curable coating was applied with a bar coater to the previously cleaned surface of an acrylic cast plate and dried at 60° C. for 30 seconds, followed by irradiation with an 80 W/cm ozone type high pressure mercury vapor lamp for 5 seconds in a nitrogen atmosphere, with the distance between the work and the lamp being set to be 15 cm. The resultant UV cured coating, forming the first layer, had a thickness of about 5 μm. Then a second layer was formed onto the first layer in accord with EXAMPLE 9. The acrylic plate, having the first layer and then the second layer formed thereon, in that order, was immersed in central part 7 of inner tank 2 of the silicon dioxide film forming apparatus diagrammed in FIG. 1, along with a sheet glass substrate, with both being maintained therein for 70 minutes to form a silicon dioxide coating thereon. The concentration of the aqueous hydrosilicofluoric acid solution, which was circulated through the silicon dioxide film forming apparatus, was 3 mol/liter, and heater 4 was adjusted to maintain the film forming temperature at 35° C. The silicon dioxide coating on the sheet glass substrate had a thickness of about 100 nm. The resultant silicon dioxide coated acrylic plate exhibited a strong adhesion that showed no peeling off with the cross-cut tape, and the increase in haze value of the acrylic plate after the Taber abrasion test was about 10%, while the water absorption was so low as to be only about 0.05%.

EXAMPLE 11

A commercially available acrylic plate was procured ("MR200", a product of Mitsubishi Rayon Co., Ltd.) which had already been coating treated with irradiation of actinic rays, by the transfer process as first described hereinabove. A second layer was formed on the surface of this acrylic plate in accord with EXAMPLE 8. Subsequently, a silicon dioxide coating was formed on the second layer, also in accord with EXAMPLE 8, except that the concentration of the aqueous hydrosilicofluoric acid solution used was changed to 3.5 mol/liter, and the operation was run under conditions such that a 200 nm thickness of silicon dioxide coating was formed on an accompanying sheet glass substrate. The resultant silicon dioxide coated acrylic plate was transparent and the coating was uniform. That plate exhibited excellent adhesion, had a water absorption of only about 0.05% and showed an increase in haze value of about 10% after the Taber abrasion test.

CONTROL 4

EXAMPLE 9 was repeated except that the formation of the UV cured coating was omitted. The resultant sample had a favorable visual appearance and low water absorption. The silicon dioxide coating thereon, however, peeled off and even simply fell off during the Taber abrasion test. The increase in haze value after the test was extremely poor, about 35%.

CONTROL 5

EXAMPLE 8 was repeated except that the second and third layers were not formed. The resultant acrylic plate coated with UV cured film, alone, showed a high water absorption of about 0.27% and an undesirably high increase in the haze value, after the Taber abrasion test, of about 40%.

EXAMPLE 12

Seika Beam PHC-2210 (a product of Dainichi Seika K.K.) was applied onto a previously cleaned polycarbonate plate by a dipping method, dried at 60° C. for about 10 seconds and then irradiated with an 80 W/cm ozone type high pressure mercury vapor lamp, set at a distance of about 10 cm from the work, for 5 seconds. The subsequent operation were conducted in accord with EXAMPLE 9 except that Seika Beam PHC-2210 was replaced by Seika Beam PHC-2201, to provide a sample product. The resultant silicon dioxide coated polycarbonate article showed a water absorption of about 0.04% and an increase in the haze value, after the Taber abrasion test, of about 12%, showing excellent improvement over an untreated polycarbonate plate which showed a water absorption of about 0.30% and an increase in haze value, after the Taber abrasion test, of about 55%.

CONTROL 6

EXAMPLE 12 was repeated except that the treatment with CSGL-0803 (a product of Chisso K.K.) was omitted. No formation of a silicon dioxide coating, however, was observed on the UV cured coating.

EXAMPLE 13

EXAMPLE 11 was repeated except that the silicon dioxide film forming temperature, as provided by heater 4, was set at 40° C., and a silicon dioxide coating was formed on the acrylic plate under such conditions as to form a 100 nm thick silicon dioxide coating on both the acrylic plate and an accompanying sheet glass substrate; the coating on the acrylic plate was transparent and uniform.

EXAMPLE 14 and CONTROL 7

The following two different acrylic plates of 50 mm×50 mm×2 mm in size were prepared:
(1) the first was coated in accord with EXAMPLE 10 to form a resultant product with a silicon dioxide film (100 nm thick) thereon (EXAMPLE 14); and
(2) the second was only surface coated with a single layer silicon dioxide film (100 nm thick) by the sputtering (vacuum) method (CONTROL 7).

These two samples were maintained by thermostatic control at 60° C. and RH 90±5% for three weeks. Thereafter the samples were examined in regard to appearance and adhesion. While the silicon dioxide coating of CONTROL 7 completely peeled off and disappeared, the silicon dioxide coating of EXAMPLE 14 showed no change in appearance and exhibited strong adhesion by the cross-cut tape test.

EXAMPLE 15

EXAMPLE 9 was repeated except that the solution for forming the second layer was prepared as follows. While mixing a system composed of 80 g of tetraethoxysilane, 20 g of γ-methacryloxypropyltrimethoxysilane and 100 g of distilled water, 0.5 ml of 0.1N hydrochloric acid was added. A subsequent 30 minutes of stirring formed an homogeneous solution. Two (2) g of this liquid hydrolyzate were diluted with 250 ml of isopropyl alcohol to provide a second layer forming solution. The resultant product had a favorable appearance and exhibited performance equivalent to that of the product of EXAMPLE 9.

EXAMPLE 16

EXAMPLE 8 was repeated except that the tetraethoxysilane used for forming the second layer was replaced by γ-methacryloxypropyltrimethoxysilane. The resultant product had a good appearance and exhibited performance equivalent to that of the product of EXHIBIT 8.

EXAMPLE 17

A UV curable coating, as specified in EXAMPLE 10, was applied onto a previously cleaned 125 μm thick polyester film and cured, under conditions as specified in EXAMPLE 10, to form a first layer. The second layer was formed as follows. While mixing 100 g of γ-aminopropyltrimethoxysilane and 100 g of distilled water, 0.5 ml of 0.1N hydrochloric acid was added and the mixture then stirred for an additional 30 minutes to form an homogeneous solution The resultant hydrolyzate solution (2 g) was diluted with 250 ml of isopropyl alcohol to provide a solution for forming the second layer. The polyester film coated with the first layer was immersed in this solution and withdrawn at a rate of 15 cm/min, followed by 30 minutes of air drying at 50° C. in a warm air oven. Thus, a second layer was formed onto the first layer. This operation was repeated under identical condition to laminate 10 coats of the second layer onto a sheet glass substrate (previously uncoated) for referential purposes. The 10 laminated coats on the sheet glass substrate had a thickness of about 50 nm, therefore the thickness of the second layer formed on the polyester film was presumed to be about 5 nm. The polyester film, on which the first and second layers were laminated in the order stated, was immersed in central part 7 of inner tank 2 of the silicon dioxide film forming apparatus diagrammed in FIG. 1, along with a sheet glass substrate, and maintained therein for 80 minutes. Thus, a silicon dioxide coating was formed on both the polyester film and the sheet glass substrate. The concentration of the aqueous hydrosilicofluoric acid solution, being circulated through the silicon dioxide film forming apparatus, was 3.5 mol/liter, and heater 4 was controlled to maintain the film forming temperature at 40° C. When the thicknesses of the silicon dioxide coatings on the polyester film and the sheet glass substrate were measured, both were found to be 100 nm. The silicon dioxide coating formed on the polyester film exhibited a strong adhesion that showed no peeling during the cross-cut tape test; when the silicon dioxide coated polyester film was immersed in 60° C. water for 20 hours, no change in adhesion was observed.

EXAMPLE 18

EXAMPLE 10 was repeated except that the solution for forming the second layer was formulated as follows. While mixing 100 g of γ-chloropropyltrimethoxysilane and 100 g of distilled water, 0.5 ml of 0.1N hydrochloric acid was added to the mixture, followed by 30 minute of stirring to form an homogeneous solution. Two (2) g of this hydrolyzate solution were diluted with 300 ml of isopropyl alcohol to provide a second layer forming solution. The resultant coated product had a good appearance and exhibited performance equivalent to that of the product of EXAMPLE 10.

EXAMPLE 19

(1) While mixing 100 g of γ-aminopropyltrimethoxysilane with 100 g of distilled water, 0.r ml of 0.1N hydrochloric acid was added to the mixture, and the system was stirred for an additional 30 minutes to form an homogeneous solution. Two (2) g of this hydrolyzate solution were diluted with 250 ml of isopropyl alcohol to provide a b-3 coating.

(2) A coating b-4 was formulated in the identical manner to the formulation of coating b-3 except that the γ-aminopropyltrimethoxysilane was replaced by γ-methacryloxypropyltrimethoxysilane.

(3) While mixing 100 g of γ-chloropropyltrimethoxysilane with 100 g of distilled water, 0.5 ml of 01.N hydrochloric acid was added to the mixture, followed by 30 minutes of stirring to form an homogeneous solution. Two (2) g of this hydrolyzate solution were diluted with 300 ml of isopropyl alcohol to provide coating b-5.

(4) While mixing 80 g of tetraethoxysilane, 20 g of γ-methacryloxypropyltrimethoxysilane and 100 g of distilled water, 0.5 ml of 0.1N hydrochloric acid was added to the mixture, and the system was further stirred for 30 minutes to form an homogeneous solution. Two (2) g of this hydrolyzate solution were diluted with 250 ml of isopropyl alcohol to provide coating b-6.

(5) Coating d-3 used in EXAMPLE 3 was applied onto a previously cleaned 125 μm thick polyester film and dried for 5 minutes at 145° C. in a hot air oven. The resultant adhesive coating had a thickness of about 2 μm. Then coating a-1 was applied onto the adhesive layer coated polyester film and heated and dried at 145° C. for 15 minutes in a hot air oven to effect curing, thus producing a first layer. This first layer coating had a thickness of about 3 μm. Then the dual layer coated polyester film was immersed in coating b-3 and withdrawn at a rate of 15 cm/min, followed by 30 minutes of heating, at 50° C. in a warm air oven, to form a second layer onto the first layer. The resultant polyester film, having laminated thereon firstly the adhesive coating, followed by the first layer then followed by the second layer, in that order, was coated with a silicon dioxide third layer in accord with EXAMPLE 2. The coating on the polyester film exhibited strong adhesion, showing no peeling off in the cross-cut adhesion test; the increase in haze value, after the Taber abrasion test, was about 7%.

EXAMPLE 20

Coating a-1 was applied directly to a previously cleaned diethylene glycol-bis-allylcarbonate polymer, without a preceding formation of a d-3 adhesive layer, and cured by 45 minutes of heating at 125° C. in a hot air oven. This first layer coating had a thickness of about 3 μm. The resultant coated article was then immersed in coating b-4, withdrawn at a rate of 15 cm/min, and dried at 50° C. for 30 minutes in a warm air oven to form a second layer onto the first layer. The diethylene glycol-bis-allylcarbonate polymer, having laminated thereon the first layer then the second layer, in that order, was then coated with a third layer of silicon dioxide in accord with EXAMPLE 1. The thus obtained coated product had a favorable appearance and a strong adhesion such that there was no peeling off of the silicon dioxide coating in the cross-cut adhesion test.

EXAMPLE 21

Coating a-2 was directly applied onto a previously cleaned acrylic extrusion-molded plate, without a previous application of adhesive coating d-3, and dried and cured by heating at 90° C. for 3 hours in a hot air oven. The thickness of this first layer coating was 3 μm. Then the resultant article was immersed in coating b-5, withdrawn at a rate of 15 cm/min, and dried at 50° C. for 30 minutes in a warm air oven to form a second layer onto the first layer. The acrylic plate, first having laminated thereon the first layer then the second layer, in that order, then had a silicon dioxide third layer coated thereon in accord with EXAMPLE 2. The resultant article had a favorable appearance, exhibited strong adhesion as indicated by no peeling off during the cross-cut tape test, and had an increase in haze value, after the Taber abrasion test, of about 10%.

EXAMPLE 22

An adhesive layer of coating d-1 was formed, in accord with EXAMPLE 1, on a previously cleaned polycarbonate plate substrate. Then, coating a-2 was applied onto the adhesive layer coated polycarbonate plate and dried and cured in a hot air oven at 120° C. for an hour. This first layer coating had a thickness of about 3 μm. The resultant dual layer coated polycarbonate plate was then immersed in coating b-6, withdrawn at a rate of 15 cm/min, and dried at 50° C. in a warm air oven for 30 minutes to form a second layer onto the first layer. The polycarbonate plate, first having laminated thereon the adhesive layer, then the first layer and then the second layer, in that order, then had coated thereon a silicon dioxide third layer in accord with EXAMPLE 2. The resultant coated product had a favorable appearance and strong adhesion as shown by no peeling off of the coating during the cross-cut adhesion test. The increase in haze value, after the Taber abrasion test, was about 6% and the water absorption was very low, being only about 0.04%.

EXAMPLE 23

(1) A silicone hard coating solution was formulated as follows. To a system composed of 39 part of γ-glycidoxypropyltrimethoxysilane, 29 part of 3,3,3-trifluoropropyltrimethoxysilane, 110 parts of methyltrimethoxysilane and 75 parts of colloidal silica ("Snowtex-C", solid content 20%, a product of Nissan Chemical Industries), was added 100 parts of 0.1N aqueous hydrochloric acid and the mixture was hydrolyzed at 80–85° C. for 2 hours under reflux. To 310 parts of this resultant quaternary co-hydrolyzate solution were added 49 parts of ethyl cellosolve, 0.9 part of ammonium perchlorate and a minor amount of a flow controlling agent, thus providing coating a-3.

(2) EXAMPLE 22 was repeated except that coating a-2 was replace with coating a-3. The resultant coated product had a good appearance and exhibited product performance equivalent to that exhibited by the product of EXAMPLE 22.

What is claimed is:

1. A coated plastic molded article consisting essentially of a plastic article onto at least one surface of which are laminated:

(a) at least one first layer having a thickness ranging from 1 to 100 μm, and comprising a cured composition containing at least one hydrolyzate of at least one silicon compound which is represented by the formula:

$$R^1Si(R^2)_3$$

wherein $R^1$ is selected from the group consisting of a $C_1$-$C_4$ hydrocarbon group, an epoxy group-containing organic group and a fluorine atom-containing organic group, and $R^2$ is selected from the group consisting of alkoxy, alkoxyalkoxy, and acetoxy groups and chlorine atoms, provided that said $R^2$s are the same or different from each other;

(b) at least one second layer, on a surface of said first layer, having a thickness ranging from about 1 to 100 nm, but less than 100 nm, and comprising at least one cured hydrolyzate of at least one silicon compound represented by the formula:

$$(R^3)_n Si(R^4)_{4-n}$$

wherein $R^3$ is selected from the group consisting of an acryloxy group-containing organic group, a methacryloxy group-containing organic group and a chlorine-containing organic group, and $R^4$ is selected from the group consisting of alkoxy, alkoxyalkoxy and acetoxy groups, and n is 0 or 1, said at least one second layer which makes said at least one second layer and said at least one third layer adhere uniformly together; and (c) at least one third layer, on a surface of said second layer, which is formed by immersing said plastic article, with said at least one first layer and said at least one second layer thereon, into an aqueous hydrosilicofluoric acid solution supersaturated with silicon dioxide, forming, on a surface of said at least one second layer, said at least one third layer which is abrasion resistant, weather resistant, chemical resistant and impervious to water;

said at least one first layer, said at least one second layer and said at least one third layer being arranged on said at least one surface of said plastic article in the order of, initially, said at least one first layer, followed by said at least one second layer, and then followed by said at least one third layer.

2. The invention of claim 1 further comprising an adhesive layer present between said at least one surface of said coated plastic molded article and said at least one first layer.

3. The invention of claim 2 in which said adhesive layer comprises at least one acrylic polymer.

4. The invention of claim 2 in which said adhesive layer comprises at least one methacrylic polymer.

5. The invention of claim 2 in which said adhesive layer comprises at least one acrylic polymer and at least one methacrylic polymer.

6. The invention of claim 1 wherein said plastic molded article is comprised of at least one material selected from the group consisting of polycarbonate, diethylene glycol-bis-allylcarbonate polymer, acrylic resin and polyester resin.

7. A coated plastic molded article comprising a plastic coated article having on at least one surface thereof:

(a) a first polymer layer having a thickness ranging from 1 to 100 μm cured with irradiation of actinic rays;

(b) a second layer, on a surface of said first polymer layer, having a thickness ranging from about 1 to 100 nm, but less than 100 nm, and consisting essentially of at least one cured hydrolyzate of at least one of the silicon compounds represented by the formula:

$$(R^3)_n Si(R^4)_{4-n}$$

wherein $R^3$ is selected from the group consisting of an acryloxy group-containing organic group, a methacryloxy group-containing organic group and a chlorine-containing organic group, and $R^4$ is selected from the group consisting of alkoxy, alkoxyalkoxy and acetoxy groups, and n is 0 or 1, said second layer which provides enhanced means for forming thereon at least one adhering and uniform third layer; and (c) a third layer, on a surface of said second layer, comprising silicon dioxide from an aqueous hydrosilicofluoric acid solution supersaturated with silicon dioxide;

said first polymer layer, said second layer and said third layer being laminated together and onto said a least one surface of said plastic molded article in the order of initially said first polymer layer, followed by said second layer, followed by said third layer, said third layer which is abrasion resistant, chemical resistant and impervious to water.

8. The invention of claim 7 wherein said first layer is formed by a method comprising curing a polyfunctional acrylate compound with irradiation of actinic rays.

9. The invention of claim 7 wherein said plastic molded article is comprised of at least one material selected from the group consisting of poly carbonate, diethylene glycol-bis-allylcarbonate polymer, acrylic resin and polyester resin.

* * * * *